United States Patent [19]
Whittier et al.

[11] Patent Number: 5,078,876
[45] Date of Patent: Jan. 7, 1992

[54] APPARATUS FOR MULTISTAGE PURIFICATION OF WATER

[75] Inventors: Scott Whittier; Calvin W. McCausland, both of Orem, Utah

[73] Assignee: Trysan Research, Inc., Provo, Utah

[21] Appl. No.: 466,504

[22] Filed: Jan. 17, 1990

[51] Int. Cl.$^5$ .................. B01D 29/00; B01D 61/00
[52] U.S. Cl. .................. 210/315; 210/294; 210/295; 210/314; 210/317; 210/321.69; 210/502.1; 422/24
[58] Field of Search ............ 210/266, 282, 288, 257.2, 210/256, 259, 321.83, 748, 501, 294, 295, 314, 315, 317, 321.69, 502.1, 252, 253, 259, 260; 422/24

[56] References Cited

U.S. PATENT DOCUMENTS

| | | | |
|---|---|---|---|
| D. 275,310 | 8/1984 | Stanley | D23/3 |
| D. 282,561 | 2/1986 | Lu | D23/204 |
| D. 288,115 | 2/1987 | McCausland et al. | D23/3 |
| D. 288,707 | 3/1987 | Macevicz et al. | D23/4 |
| D. 290,286 | 6/1987 | Padilla | D23/1 |
| D. 290,638 | 6/1987 | Bishop | D23/3 |
| D. 295,438 | 4/1988 | Bray | D23/207 |
| D. 295,887 | 5/1988 | Hopkins | D23/207 |
| D. 296,126 | 6/1988 | Clark | D23/207 |
| 3,367,504 | 2/1968 | Westmoreland | 210/321 |
| 3,397,790 | 8/1968 | Newby et al. | 210/321 |
| 3,887,463 | 6/1975 | Bray | 210/110 |
| 4,218,317 | 8/1980 | Kirschmann | 210/117 |
| 4,301,009 | 11/1981 | Cook et al. | 210/278 |
| 4,368,123 | 1/1983 | Stanley | 210/269 |
| 4,548,716 | 10/1985 | Boeve | 210/652 |
| 4,609,463 | 9/1986 | Macevicz et al. | 210/238 |
| 4,666,600 | 3/1987 | Hankammer | 210/266 |
| 4,670,144 | 6/1987 | McCausland et al. | 210/244 |
| 4,705,625 | 11/1987 | Hart, Jr. | 210/257.2 |
| 4,709,831 | 12/1987 | Coplan | 220/304 |
| 4,711,723 | 12/1987 | Bray | 210/652 |
| 4,744,895 | 5/1988 | Gales et al. | 210/96.2 |
| 4,759,844 | 7/1988 | Lipschultz et al. | 210/257.2 |
| 4,781,831 | 11/1988 | Goldsmith | 210/247 |
| 4,902,411 | 2/1990 | Lin | 210/288 |
| 4,911,840 | 3/1990 | Underwood | 210/321.83 |
| 4,971,687 | 1/1991 | Anderson | 210/256 |

OTHER PUBLICATIONS

Nimbus ® Advertisement for the Nimbus Model N-3A Drinking Water Appliance.
"The RO Process", *Water Technology*, p. 29, Aug., 1984.
Hofheins, Waymon, "Reverse Osmosis: Membrane Technology", *Water Technology*, pp. 24-28, Aug., 1984.
Hofheins, Waymon, "What's New in Membrane Separation", *Water Technology*, pp. 30, 32, 36, Aug., 1984.
"Emerging Membrane Separation Technologies", *Water Technology*, pp. 42-44, Aug., 1984.
Stansbury, Suzanne L., "Bottled Profits—POU Dealers Find a Pipeline into Bottled Water Returns", *Water Technology*, pp. 16-18, 21-22, 25, Jun., 1988.
"Glossary of Water Treatment Terms", *Water Technology*, pp. 10-11, Dec., 1988.

*Primary Examiner*—Robert A. Dawson
*Assistant Examiner*—David Reifsnyder
*Attorney, Agent, or Firm*—Mallinckrodt & Mallinckrodt

[57] ABSTRACT

An apparatus and method for the purification or water using a multistage purification system which can be connected to a source of potable water under pressure. The multistage purification system has a cylindrical pressure vessel supported on a circular leg which is capable of stable disposition on a level surface such as a countertop. The pressure vessel has a top member and a base member connected in sealed engagement. The base member has an inlet for receiving water into the pressure vessel and an outlet for discharging reject water from the pressure vessel. Housed within the pressure vessel is a plurality of purification mediums disposed in concentric disposition. In the core area of the pressure vessel, an interchangeable core member may be removably connected to the pressure vessel. Each interchangeable core member houses an additional medium for purifying water and a pure water outlet through which the purified water passes for use by the user. Influent water is purified by passing through a plurality of purification mediums before discharge for use. The purification capabilities of the system can be tailored to the user's need and a soiled or defective core member may be replaced without compromising the integrity of the system by simply changing interchangeable core members.

39 Claims, 5 Drawing Sheets

APPARATUS FOR MULTISTAGE PURIFICATION OF WATER

FIELD OF THE INVENTION

The present invention relates to an apparatus used for purifying water, and more particularly to a countertop, multistage water purification system configured to utilize flexibly a plurality of purification mediums thereby addressing the user's purification needs and desires.

BACKGROUND OF THE INVENTION

Various types of apparatus have been used to purify water. Over the years a number of purification devices have been developed to meet the needs of the users who desire to purify their water supply. It seems that as technology advances in our society, more contaminants and additives are found in our water supplies. Thus, in order to reduce our exposure to impurities in our water, it has become increasingly important to purify our water before it is consumed.

In particular, many homeowners have shown an increasing concern over the extent of contamination in their drinking water supplies. To address that concern, such homeowners have taken a variety of measures to ensure supply of pure drinking water. Some homeowners purchase bottled water while others install water purification systems in their homes.

At present, there are numerous types of home water purification systems that are available. There are systems which utilize distillation, activated carbon filtration, sediment filters, deionization, ion exchange, reverse osmosis separation, and other types of filtration and separation systems for removing impurities from potable water. The types of systems available to the homeowner range from simple filters with limited capacities to remove impurities to elaborate and expensive systems which may be complex and cumbersome. There are units which attach directly to and hang from the faucet or tap. There are also units which require complex plumbing attachments prior to connection with the faucet or tap. Additionally, there are countertop units which can be connected to the faucet or tap, but occupy countertop space near the faucet or tap.

Most water purification systems require a pressure vessel connected to an influent supply of potable water. The water enters the pressure vessel and the impurities in the water are filtered and/or separated out by the water being forced under pressure through a filtering or separating medium. Reject water is then allowed to drain from the system, and the effluent purified water is directed to an outlet for consumer use. Typically, the pressure vessel is contained in an outer housing which is more aesthetically pleasing in appearance than the pressure vessel Also, the usual apparatus has the inlet at one end of the pressure vessel and the outlet at the other end of such vessel. Thus, it is not unusual that significant plumbing considerations are encountered to accommodate the pipes, tubes or hoses needed to connect the purification system to the homeowner's present plumbing.

It has always been the case that certain types of filters or separation mediums are more efficient at removing certain types of impurities in the water. Thus, although an activated carbon filter may filter out unwanted minerals or gas, it does not eliminate bacterial or viral impurities. As a consequence, all single stage purification systems are limited to purification that can be effectively accomplished by the single purifying medium within the pressure vessel.

In an attempt to address the limitations of single stage purification systems, several multistage purification systems have been developed which combine at least two purifying mediums into one device or into a series of separate devices to incorporate the advantages of each medium in the purification process. A major drawback to multistage purification of water in a system to be available to the homeowner is that such systems can be complex and costly. There are systems which require elaborate tubing between the water source and purifying mediums. Additionally, the amount or degree of impurities contained in the potable water supplied to a home may vary dramatically from one place to another. Thus, while one homeowner may have a need for eliminating bacterial contamination, another homeowner may have a need to remove a high degree of contaminant particulate. Consequently, homeowners in each community may face very different purification needs. For example, homeowners in one community may have no need for a system to remove bacterial contamination, and homeowners in that community certainly would not desire to purchase that capability if it is not needed.

Furthermore, with usage, the purification system collects the impurities which are captured within the filters and the like. This can dramatically reduce the efficiency of the purification system. Some of such systems do not have replaceable mediums. Thus, instead of just replacing the clogged medium with a new clean medium, a new system must be purchased.

Although there have been a number of developments in household water purification systems, it would be an improvement to provide an apparatus in which purification mediums can be interchanged without compromising the integrity of the system so that a homeowner user may tailor the water purification system to the water purification needs of a particular household.

Additionally, it would be an improvement to provide a countertop water purification system wherein all of the inlet and outlet connections are made at one end of the device to maintain the plumbing needs at a minimum.

It would be a further improvement to provide a pressure vessel with an attractiveness that would not require the pressure vessel to be placed in an outer housing.

Still another improvement would be to provide a storage compartment beneath the pressure vessel which is compatible with the attractive outward appearance of the pressure vessel, such storage compartment being provided to store unsightly tubes and connections and to serve as a base upon which the purification system can rest securely on a countertop.

Yet another improvement would be to provide a purification system in which purification mediums can be interchanged to replace a clogged or dirty medium with a fresh, new medium thereby enhancing the operating efficiency of the system and reducing the likelihood that the system must be discarded.

It would be a further improvement to provide a multistage purification system which directs the influent potable water through filtration and separation stages within a single, compact container which would utilize a minimum of countertop space and eliminate the need for interconnecting tubing between purification stages.

OBJECTS AND BRIEF SUMMARY OF THE INVENTION

In view of the foregoing needs and problems experienced by homeowners desiring water purification systems, it is a primary object of the present invention to provide an improved water purification system that can offer the homeowner the flexibility to purify water according to the homeowner's need by interchangeably introducing various types of purification mediums into the system or replacing soiled mediums, without compromising the integrity of the system, to accomplish the most efficient water purification for that homeowner's needs.

It is another object of the present invention to provide an apparatus which can be placed on a countertop near the faucet or tap from which the water is taken for treatment, such countertop purification system having its inlet and outlet connections proximate to one end of the system to reduce the need for significant plumbing.

A further object of the present invention is to provide an apparatus which is attractive and compact such that it occupies a minimum of countertop space and offers an outward appearance which is aesthetically pleasing to the homeowner.

Another object of the present invention is to provide an attractive pressure vessel so that the pressure vessel need not be contained within an additional housing to conceal an unsightly pressure vessel, interconnecting tubing and/or unsightly inlet and/or outlet connections.

Still another object of the present invention is to be configured to provide an enclosed storage compartment beneath the pressure vessel for storing the tubes and connections away from the homeowner's view, and wherein such configuration provides a stable base upon which the pressure vessel can securely rest upon a countertop or any level surface.

Yet another object of the present invention to provide multistage purification of water in a compact, appliance-like container to maximize purification capabilities while eliminating interconnecting tubing between purification stages and occupying a minimum of space.

The foregoing objects are accomplished by an apparatus of the present invention which is used to purify water supplied to the system from a source such as a tap or faucet. The compact, multistage water purification system of the present invention comprises a dome-shaped substantially cylindrical pressure vessel which rests on a circular support leg in stable disposition on a level surface. The cylindrical pressure vessel comprises two separate pieces which can be connected by threaded engagement or some other suitable means of connection. When the pressure vessel is positioned to rest upon its circular support leg, it has a base end proximate to the circular support leg and a top end remote from the circular support leg. Inlet and outlet connections to the pressure vessel are located at the base end of the pressure vessel, and an opening in the circular support leg permits the passage therethrough of tubing into and away from the pressure vessel.

Within the pressure vessel the purification mediums are configured to be disposed concentrically. As source water enters the system through the inlet at the base of the pressure vessel, the water is directed upwardly into an annular plenum bordered by the inside wall of the pressure vessel and the first purification medium. The first purification medium is annular and may be comprised of any of a number of known water purification mediums. In a preferred embodiment of the present invention the first purification medium is a sediment filter impregnated with carbon which is designed to remove chlorine and other impurities from the water. In another preferred embodiment the first purification medium comprises an assembly of a fibrous pre-filter and an annular bed of activated carbon.

As the water passes through the first purification medium it is directed into a second annular plenum which feeds the water into an annular reverse osmosis module of a conventional type. The separation of impurities from the water is accomplished by reverse osmosis as the water, under pressure, spirals inwardly towards a core within the pressure vessel. Reject water is dispersed through a flow restricting tube or hose at the base of the pressure vessel. Purified water passes through openings in a perforated core cylinder into the core area of the pressure vessel.

In one preferred embodiment of the present invention the purified water is directed towards the top portion of the pressure vessel and is permitted to flow through an opening or portal in a center tube filled with activated carbon. Thus, with this embodiment, the water undergoes post-reverse osmosis filtration to further remove impurities from the water. The water is then discharged through an outlet for use by the homeowner.

In another embodiment of the present invention the center tube is not filled with activated carbon, but rather houses an ultraviolet tube about which the water may flow from the top of the pressure vessel towards the base of the pressure vessel for discharge for use by the homeowner. In the ultraviolet tube embodiment, exposure of the water to ultraviolet radiation from the tube is designed to reduce bacterial or viral impurities within the water.

The cylindrical center tubes which house either an ultraviolet tube or activated carbon are interchangeable by means of a twist-lock connection or any other suitable connection into the pressure vessel. Thus, the cylindrical center tubes may be interchanged without compromising the integrity of the purification mediums within the pressure vessel. Further, a soiled filter can be replaced without replacing the entire system.

In still another embodiment of the present invention the water passing through the perforations in the core cylinder into the core area from the reverse osmosis module is directed towards the base of the pressure vessel where it exits into an annular filter comprising activated carbon. The water passing through the activated carbon is then directed through a feeder tube upwardly into a center tube which houses an ultraviolet tube. The water is then permitted to flow about the ultraviolet tube from near the top of the pressure vessel towards the base of the pressure vessel where it can be discharged for use by the homeowner. In this embodiment, the water undergoes both carbon filtration and ultraviolet exposure after having passed through the reverse osmosis module.

Consequently, the apparatus of the present invention provides the homeowner with tremendous versatility. The apparatus of the present invention can be used to address any of a number of water purification problems, and if the system as configured by the homeowner does not meet the homeowner's purification desires, it can be configured to provide additional, or different purification capabilities.

These and other objects and features of the present invention will become more fully apparent through the following description and appended claims taken in conjunction with the accompanying drawings.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
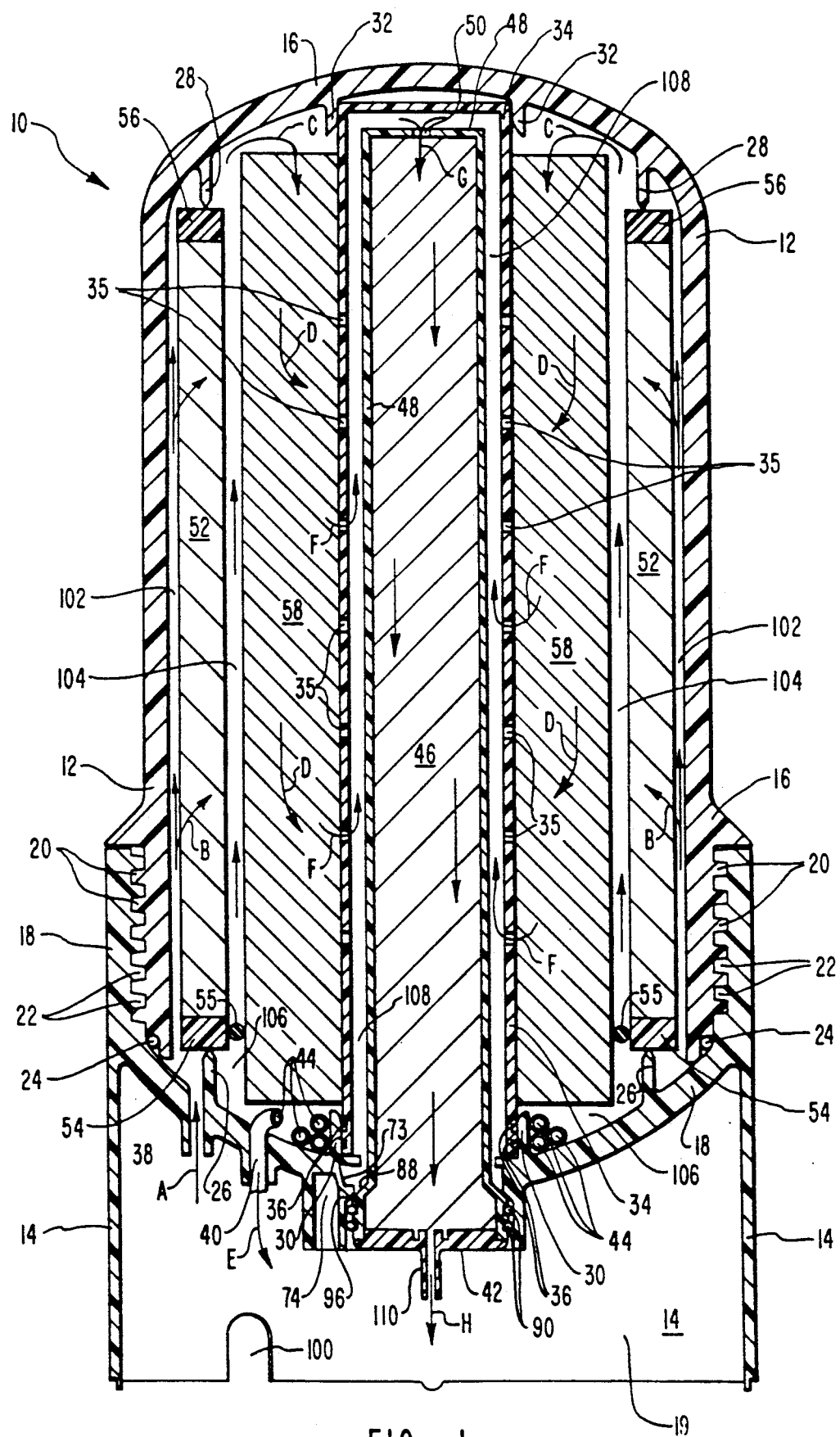
FIG. 1 is a vertical sectional view of the apparatus of the present invention wherein basic purification mediums are illustrated and arrows are shown to indicate the direction of water flow through the system.

Referring now specifically to the drawings, wherein like numerals indicate like parts throughout, the water purification system of the present invention is generally designated 10 and comprises a cylindrical pressure vessel 12 with a circular support leg 14 designed to provide stable disposition when the system is placed on a level surface such as a countertop. The pressure vessel 12 comprises a top member 16 and a base member 18 which can be adjoined and sealed to provide an interior compartment for housing water purification mediums in concentric disposition. The base member 18 and the support leg 14 are configured to define a storage compartment 19 between the base member 18 and the surface upon which the system 10 rests and as enclosed by the support leg 14.

In a preferred embodiment, as shown in FIGS. 1-4, the top member 16 is secured to the base member 18 by threaded engagement, top member 16 has male threads 20 which are capable of secure connection by engagement with female threads 22 disposed on the base member 18. To seal the connection from leakage through the threaded engagement area, an O-ring 24 is disposed between the top member 16 and the base member 18 at a sealing point such that the pressure inside the pressure vessel 12 forces the O-ring 24 to seal the connection. Although it is preferred that the top member 16 and the base member 18 be connected using square threads such as is shown in the drawings, it should be understood that other types of threads or other forms of connection may be used so long as the connection maintains the integrity of the pressure within the pressure vessel 12.

The pressure vessel 12 further comprises interior seals and gussets for positioning the purification mediums and defining flow paths of the water as it passes through the system 10. A circular base seal 26 and a circular top seal 28 are provided to seal the influent water from bypassing the first purification medium, as shown in FIG. 1. A circular base gusset 30 and a circular top gusset 32 are provided to position a perforated core cylinder 34 about the core area of the pressure vessel 12 and to secure the perforated core cylinder 34 from lateral or longitudinal movement. The perforated core cylinder 34 has a plurality of perforations 35 and is sealed into position by O-rings 36.

The base member 18 also comprises an inlet 38, a reject water outlet 40, and a receiving portal 42. The inlet 38 is easily connectable to a source of influent potable water from a tap or faucet by tubing (not shown). The reject water outlet 40 is equipped with a flow restrictor 44 such as a small capillary tube or a larger diameter tube of a length sufficient to restrict the flow of effluent reject water from the system 10 and to maintain water pressure within the system 10 so that the purification mediums can operate at optimum efficiency. The receiving portal 42 is configured to receive in sealed engagement any of a plurality of center tubes for disposition within the perforated core cylinder 34. In the embodiment shown in FIG. 1, the center tube in use is an activated carbon 46 filled filter center tube 48 with a top portal 50.

Turning now to the purification mediums shown in the preferred embodiment illustrated in FIG. 1, it should be understood that the disposition of the purification mediums in concentric stages eliminates the need for interconnecting tubing, thus eliminating a great deal of complexity from the system 10. The first purification medium comprises a sediment filter 52 impregnated with carbon. The primary purpose of the sediment filter 52 is to remove chlorine and sediment from the water before it enters the next stage of purification. A preferred type of sediment filter 52 is a batting with carbon powder impregnated within the fiber, but other types of sediment filters 52 may be used. The sediment filter 52 is disposed between a base annular barrier 54 and a top annular barrier 56 each of which are impermeable to water so that there is no leakage of water through the seals formed by the top seal 28 and the top annular barrier 56 and by the base seal 26 and the base annular barrier 54. The base annular barrier 54 contacts an O-ring 55 disposed between the base annular barrier 54 and the second purification medium, thereby restricting the flow of water from bypassing the second purification medium.

In the embodiment shown in FIGS. 1 through 4, the second purification medium comprises a conventional reverse osmosis module 58. The reverse osmosis module 58 comprises a reverse osmosis membrane which is wound spirally around the perforated core cylinder 34. Typically, a reverse osmosis membrane comprises a three-layer combination wherein one layer is an open netted material, the center layer is the membrane of cellulose acetate, polyamide, or some other suitable membrane material, and the third layer is a material such as sail cloth. The reverse osmosis membrane acts like an envelope which captures the water within the envelope and the water traverses the membrane in a type of molecular traversal separating the water from impurities which are carried out in the reject water which does not traverse the membrane. Configured or rolled reverse osmosis membranes are commonly called leafs and can be made to various lengths.

In the preferred embodiments of the present invention, a plurality of leafs are wound spirally about the perforated core cylinder 34, one to three leafs have been found to be ideal depending on the length of the leafs to achieve an acceptable amount of purified water passing through the reverse osmosis stage. It should be understood; however, that more than three leafs may be used.

To achieve the most efficient separation by reverse osmosis, water pressure must be maintained at a level conducive to the process. The flow restrictor 44 through which reject water (i.e., water that does not go through the reverse osmosis stage) passes is instrumental in maintaining the pressure within the system 10 at between 25 and 150 psi when the influent water from the water source is supplied at typical household water pressure. If the discharge flow of reject water was not restricted, but allowed to flow freely out of the pressure vessel 12, the water pressure in the system 10 would be lost and reverse osmosis could not efficiently occur.

In the preferred embodiment shown in FIG. 1, a third purification stage is provided which utilizes the cylindrical filter center tube 48 filled with activated carbon 46. By directing potable water through the three stages of purification shown in FIG. 1, chlorine, organics, undesirable chemicals, heavy metals, dissolved solids, and particulate solids are removed from the water. Because the filter center tube 48 may be removed from the pressure vessel 12 easily, the activated carbon 46 filter is readily replaceable without requiring the user to discard the entire system 10. Additionally, three devices for water purification are housed in one attractive, appliance-shaped apparatus.

Figure 2:
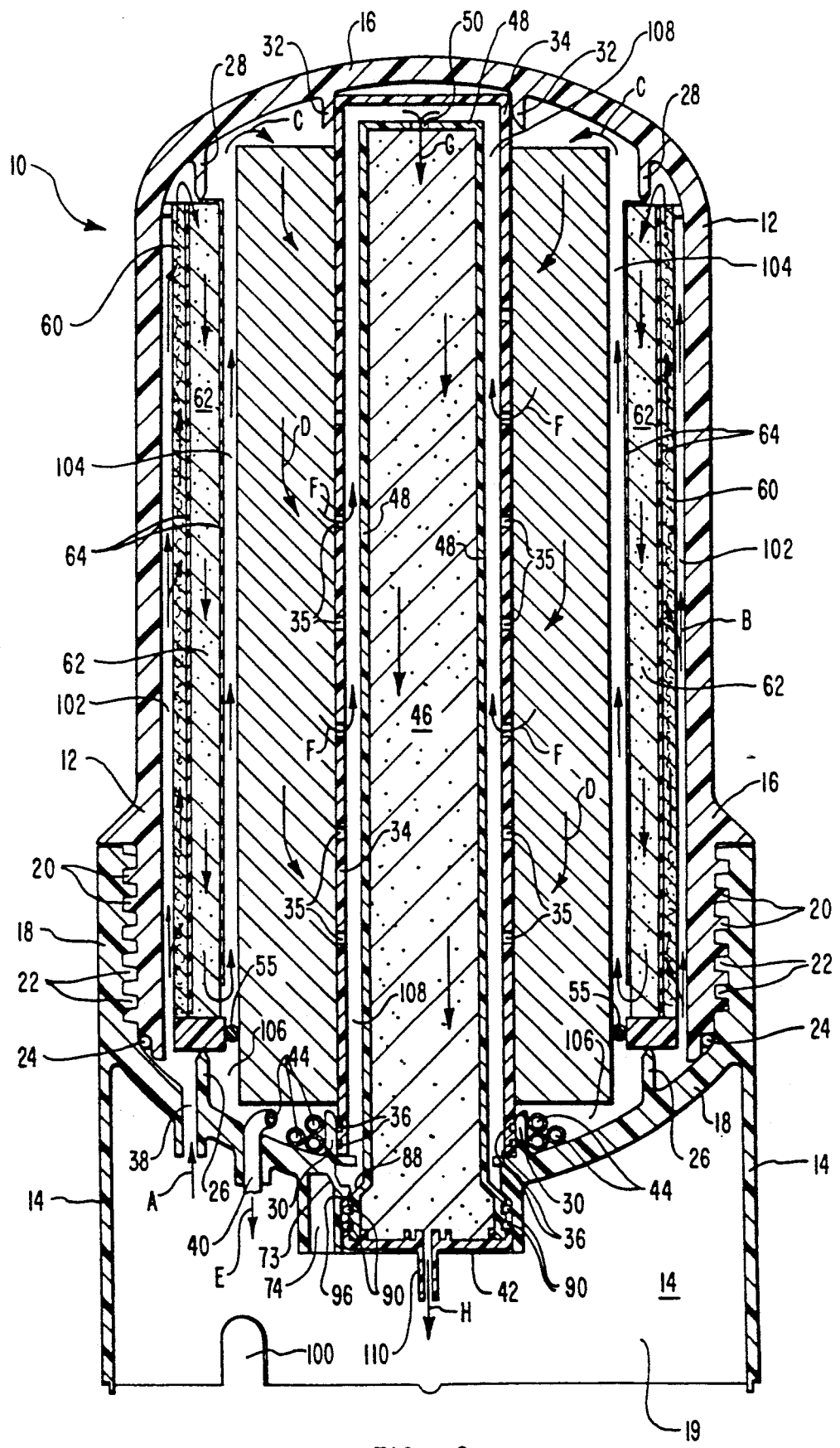
FIG. 2 is a vertical sectional view of another preferred embodiment of the apparatus of the present invention showing a pre-filter and an activated carbon module disposed in the position of the first purification medium.

FIG. 2 illustrates a preferred embodiment of the present invention which utilizes essentially the same three stage purification system as is shown in FIG. 1, except a modified first purification stage is used. Instead of the sediment filter described in FIG. 1, an assembly comprising a pre-filter 60 and a bed of activated carbon 62 is used. The bed of activated carbon 62 is disposed in an annular casing 64 and the casing 64 is wound with a fibrous material which serves as the pre-filter 60. Although FIG. 2 shows a space between the inside wall of the pressure vessel 12 and the pre-filter 60, it should be understood that the pre-filter 60 may occupy most all of the space between the inside wall of the pressure vessel 12 and the casing 64 housing the bed of activated carbon 60.

Figure 3:
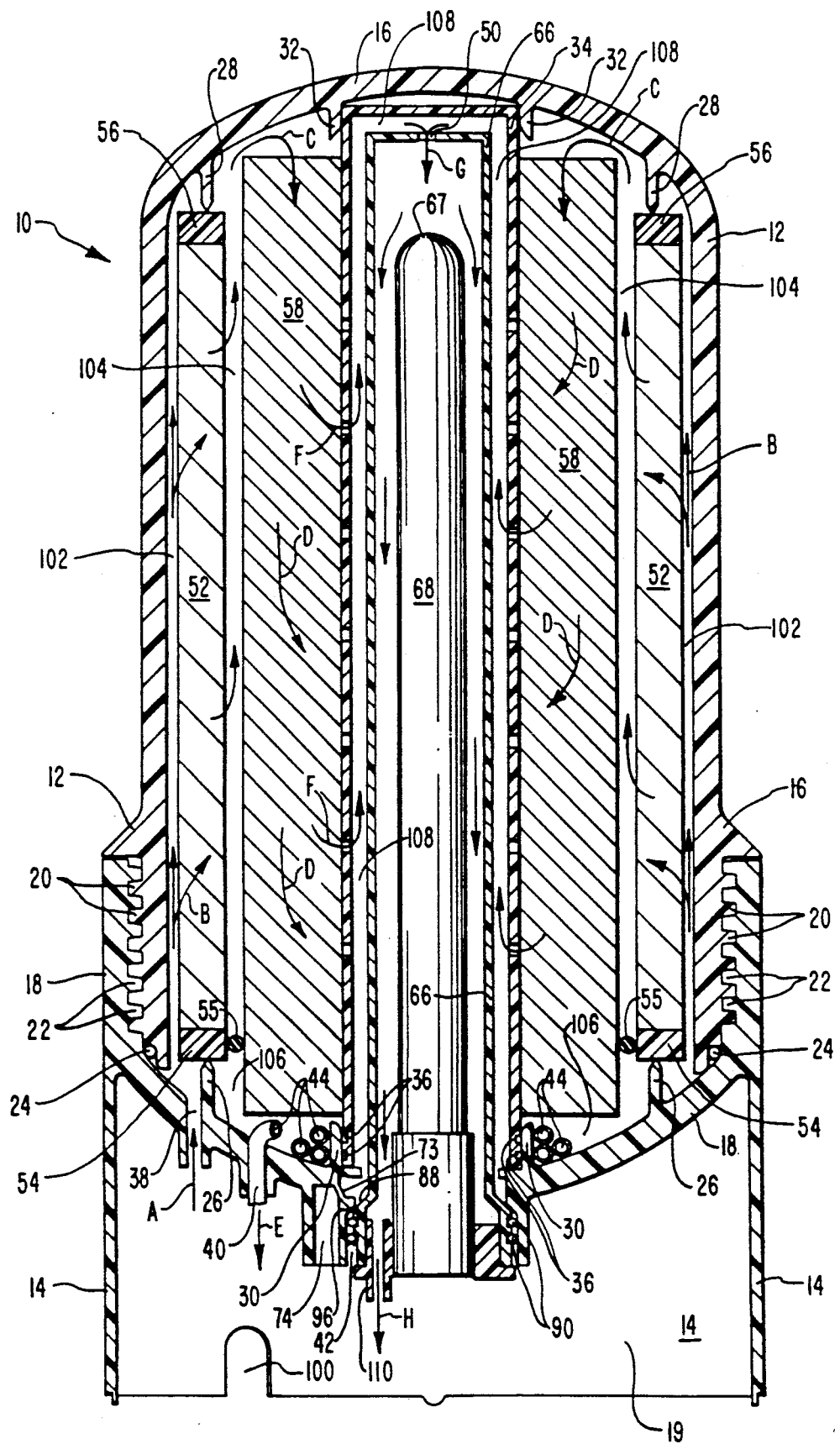
FIG. 3 is a vertical sectional view of another preferred embodiment of the present invention showing an ultraviolet tube disposed within the core area of the pressure vessel.

Referring now to FIG. 3, an alternative preferred embodiment of the present invention is shown. The system 10 utilizes the same first two stages of purification as is shown in FIG. 1, namely, the sediment filter 52 and the reverse osmosis module 58, but the third stage of purification differs. FIG. 3 shows a hollow center tube 66 with a quartz envelope 67 enclosed an ultraviolet tube 68 disposed therein. The use of the ultraviolet tube 68 gives the user an option for disinfecting the water by eliminating bacteria and viruses. As water circulates through the hollow center tube 66, it is exposed to the radiation from the ultraviolet tube 68 before it is discharged from the system 10 for use.

Although the embodiment shown in FIG. 3 shows a sediment filter 52 and a reverse osmosis module 58 as the first two mediums, it should be understood that alternative filtration and/or separation mediums may be used as the first two purification stages without departing from the spirit of the present invention.

Figure 4:
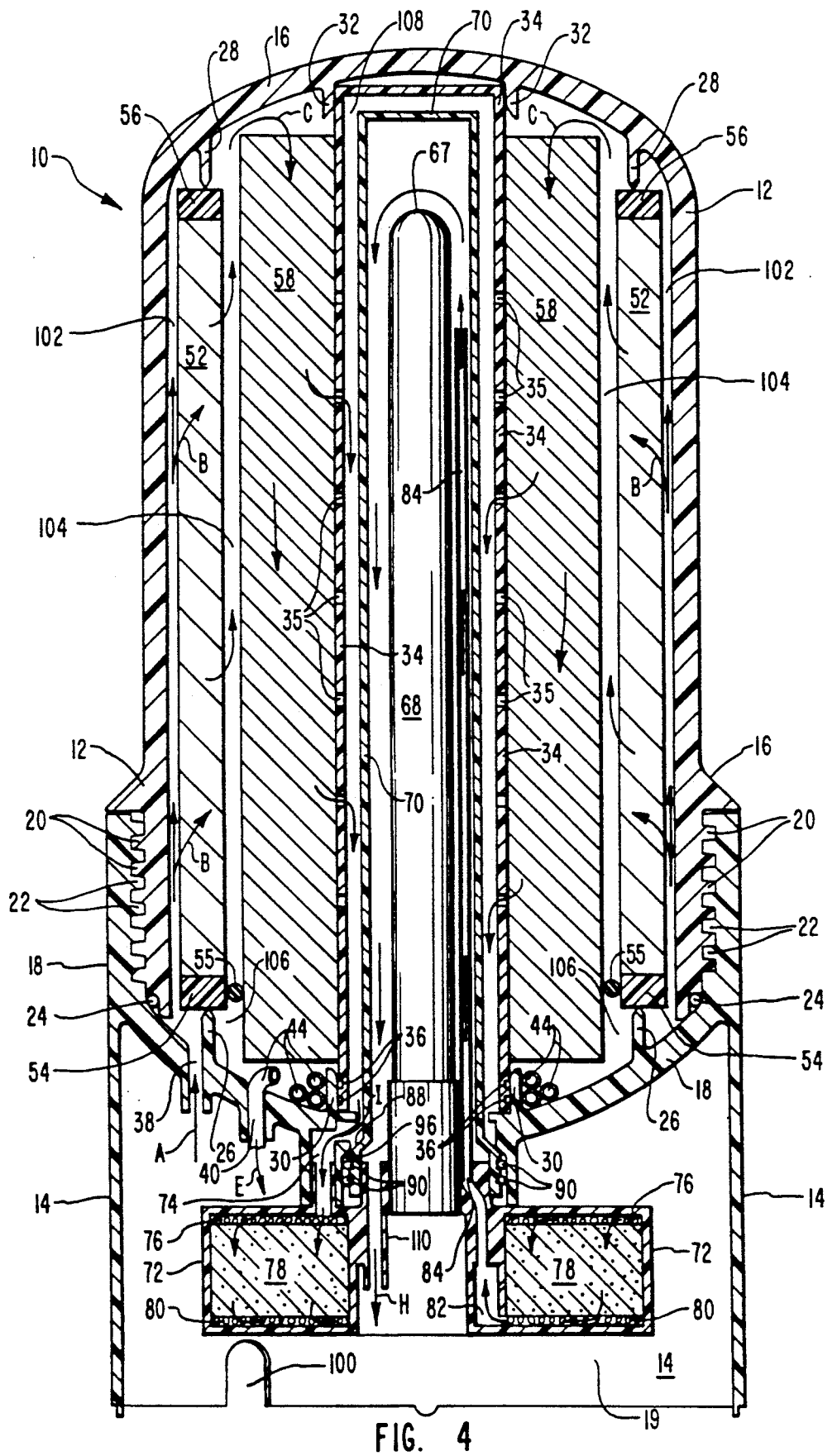
FIG. 4 is a vertical sectional view of still another preferred embodiment of the present invention showing an altered directional flow through an annular activated carbon base unit and then back into the pressure vessel for exposure to the radiation from the ultraviolet tube.

With reference now to FIG. 4, an alternative preferred embodiment is shown in which an additional purification stage is introduced to the system 10 without detracting from the outward attractiveness of the apparatus. A modified center tube 70 is provided which comprises an annular base filter 72 and does not have a top portal. In the absence of the top portal, a bridge plug 73 (See FIGS. 1-3) is removed thereby altering the flow direction of the water. Removal of the bridge plug 73 can be accomplished by striking it with a solid object. The modified center tube 70 then assists to direct the flow of the water leaving the reverse osmosis module 58 towards the base member 18 and through a Conduit 74 into the base filter 72 which is disposed within the storage compartment 19. Internal of the base filter 72 is a fibrous mat 76 which serves to disperse the water flow evenly across the face of an activated carbon ring 78. A second fibrous mat 80, within the base filter 72, serves to collect the water percolating through the carbon ring 78 and direct the water to a feeder channel 82 connected to a feeder tube 84 directed into the modified center tube 70. Within the modified center tube 70 is an ultraviolet tube 68 for disinfecting the water passing therethrough. In this embodiment, both filtration and disinfection is accomplished after the water is separated from impurities by traversing the reverse osmosis module 58.

Figure 5:
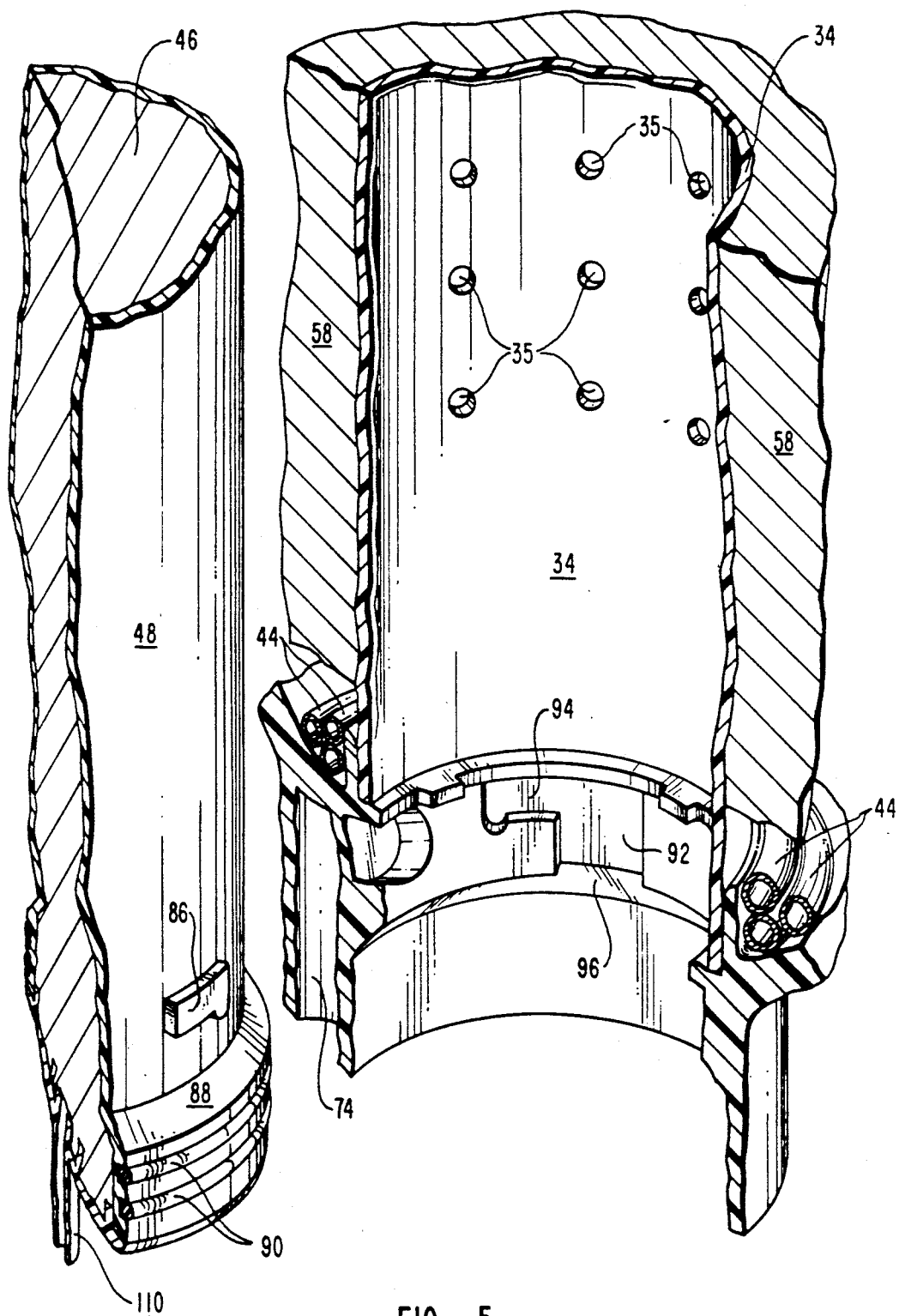
FIG. 5 is an enlarged perspective view of a cutaway portion of the perforated core cylinder and a center tube showing a type of twist-lock connection for the center tube to the pressure vessel.

Referring now to FIG. 5, a type of twist-lock connection is shown for connecting the perforated core cylinder 34 to either a filter center tube 48, a hollow center tube 66, or a modified center tube 70. Each of the center tubes has an ear 86 disposed on the exterior of the center tube, a bevelled lip 88, and O-rings 90. Ears 86 are disposed and configured to engage a slot 92 and a notch 94 formed in the interior wall of the perforated core cylinder 34. Also formed in the interior wall of the perforated core cylinder 34 is a bevelled annular seat 96.

When one of the interchangeable center tubes is inserted into engagement with the perforated core cylinder 34, the ear 86 slides up the slot 92 until the bevelled lip 88 engages the bevelled annular seat 94 and then the center tube is rotated to position the ear 86 in locking engagement with the notch 94. The O-rings 90 serve to seal the connection from leakage. To remove the positioned center tube, the center tube is rotated in an opposite direction to release the ear 86 from the notch 94 so that the center tube can be retracted from the core area of the pressure vessel 12. The removed center tube may be re-inserted or one of the interchangeable center tubes may be inserted.

Although a twist-lock connection is shown in FIG. 5 for connecting one of the center tubes to the perforated core cylinder 34, it should be understood that any other type of detachable connection that seals the connection from the water pressure inside the pressure vessel may be used without departing from the spirit of the invention.

The methods for purifying potable water by using the preferred embodiments of the present invention vary according to which embodiment is used. Such methods are best understood by following the flow path of the water through each embodiment. In FIG. 1, influent potable water is introduced into the system 10 by connecting a tube or hose (not shown) to a water source such as a faucet or tap (not shown) and passing that tube or hose through a doorway 100 in the circular support leg 14 for connection with the inlet 38. The connections for connecting the hose or tube to a faucet or tap and to the inlet 38 may be of a conventional type, and a quick-release pressure connection is preferred. Water enters into the pressure vessel 12 through inlet 38 as shown by Arrow A. Upon entering the pressure vessel 12, the water fills an entry plenum 102 which is an annular space between the inside wall of the pressure vessel 12 and the sediment filter 52 of the first purification stage. Due to the water pressure typically supplied by the water source, water is forced through the sediment filter 52, as shown at Arrows B. In passing through the sediment filter 52, the water is filtered to remove certain impurities such as chlorine, sediment and the like.

As the water exits the sediment filter 52, it enters into an annular internal plenum 104 which directs the water flow into the reverse osmosis module 58, as shown at Arrows C. Water that traverses the reverse osmosis module 58 is separated from impurities (e.g., dissolved solids) in manner that can be characterized as a molecule filter. Such traversal of the water in the spirally wound reverse osmosis module 58 is signified by the curved Arrows D. The water that does not traverse the reverse osmosis membrane collects in a reject water reservoir 106 where such reject water makes its way into and through the flow restrictor 44 and is discharged (typically to a drain) through the reject water outlet 40, as shown at Arrow E. As was explained with regard to the hose or tube connected to the water source, a hose or tube (not shown) is connected in conventional fashion to the reject water outlet 40 and is directed through the doorway 100 to a drain or to some other use for the reject water.

The water traversing the reverse osmosis module 58 exits through the perforations 35 (see Arrows F) in the perforated core cylinder 34 into a core area 108 of the pressure vessel 12. This purified water, having passed through two stages of purification, enters into the filter center tube 48 through top portal 50 (see Arrow G) and percolates through the activated carbon 46 to a purified water outlet 110 where the water is discharged to the user (see Arrow H). The purified water passes through the purified water outlet 110 into a hose or tube (not shown) connected in a conventional fashion to the outlet 110. The hose or tube carries the effluent purified water through the doorway 100 to the user for consumption or use.

In a similar manner, the water travels through the system 10 in the preferred embodiment illustrated in FIG. 2, except that instead of passing through the sediment filter described in FIG. 1, the potable water entering the system 10 passes through the pre-filter 60 before entering into and percolating through the bed of activated carbon 62. Such pre-filtering is designed to remove impurities that can damage the reverse osmosis membrane.

Turning now to FIG. 3, water travels inwardly through the concentric first and second purification mediums, as described above, into the core area 108. The purified water is then directed through top portal 50 into the hollow center tube 66 (Arrow G) where it is exposed to ultraviolet radiation from the ultraviolet tube 68. The now disinfected water exits the hollow center tube 66 at the purified water outlet 110 (Arrow H) for delivery to the user.

With reference now to the embodiment of the present invention shown in FIG. 4, the water travels inwardly through the concentric first and second purification mediums, as previously described, and enters the core area 108 where it is directed through conduit 74 (as shown by Arrow I) into the base filter 72. The fibrous mat 76 disperses the water evenly over the face of the activated carbon ring 78. The water percolates through the carbon ring 78 and is collected by the second fibrous mat 80 which delivers the newly filtered water into the feeder channel 82. The pressure within the system 10 then forces the water within the feeder channel 82 into the feeder tube 84 which communicates with the feeder channel 82. The water is then directed into the modified center tube 70 where it is exposed to the disinfecting ultraviolet radiation from the ultraviolet tube 68. The purified water, having also been disinfected, is discharged to the user through the purified water outlet 110 in a manner as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A multistage purification system adapted to be connected to inlet tubing from a water source and to outlet tubing for discharging reject water, comprising:
    a substantially cylindrical pressure vessel having a base end and an opposite end, said pressure vessel including inlet means on the base end of the pressure vessel for receiving water into said pressure vessel for purification, at least one rejected water outlet means on the base end of the pressure vessel for discharging rejected water from said pressure vessel, and a central core area within the pressure vessel opening through the base end of the pressure vessel to outside the pressure vessel;
    at least one purification medium disposed within said pressure vessel and spaced radially outwardly from and concentrically surrounding the central core area; and,
    an interchangeable core member for disposition within the central core area within said pressure vessel, said interchangeable core member being removably connected to said base end of the pressure vessel and housing an additional means for purifying water, said interchangeable core member including a pure water outlet means, said pure water outlet means being on the base end of the pressure vessel when the core member is connected to the base end of the pressure vessel.

2. A purification system as set forth in claim 1, wherein said pressure vessel further includes a circular support leg upon which said pressure vessel rests for stable disposition on a level surface.

3. A purification system as set forth in claim 2, wherein said support leg and the base end of said pressure vessel define a compartment within which the inlet means, rejected water outlet means, and the pure water outlet means are located.

4. A purification system as set forth in claim 3, wherein said support leg further includes an opening through which inlet tubing, rejected water outlet tubing, and pure water outlet tubing may pass to the inlet means and from the rejected water outlet means and pure water outlet means.

5. A purification system as set forth in claim 1, wherein said pressure vessel further comprises a base member including said base end and a top member including said opposite end connected together in sealed engagement such that the water pressure within the pressure vessel is maintained if influent water is supplied to said pressure vessel under pressure.

6. A purification system as set forth in claim 5, wherein said base member is connected to said top member by threaded engagement.

7. A purification system as set forth in claim 1, wherein the at least one purification medium includes a sediment filter.

8. A purification system as set forth in claim 7, wherein said sediment filter is disposed such that said sediment filter is the first purification medium encountered by influent water.

9. A purification system as set forth in claim 1, wherein the at least one purification medium includes an assembly comprising a pre-filter and an activated carbon filter.

10. A purification system as set forth in claim 9, wherein said assembly is disposed such that said assembly is the first purification medium encountered by influent water.

11. A purification system as set forth in claim 1, wherein the at least one purification medium includes a reverse osmosis module.

12. A purification system as set forth in claim 11, wherein the at least one purification medium includes two purification mediums, the reverse osmosis module being one of said mediums, and wherein the reverse osmosis module is disposed such that said reverse osmosis module is encountered after encountering the other of said purification mediums.

13. A purification system as set forth in claim 11, further including a perforated core cylinder encircling said core area, and wherein said reverse osmosis module encircles said perforated core cylinder.

14. A purification system as set forth in claim 1, wherein said interchangeable core member including an activated carbon filter.

15. A purification system as set forth in claim 1, wherein said interchangeable core member houses an ultraviolet tube.

16. A purification system as set forth in claim 1, wherein said interchangeable core member houses an activated carbon filter and an ultraviolet tube; said activated carbon filter being disposed such that influent water encounters said activated carbon filter prior to encountering said ultraviolet tube.

17. A purification system as set forth in claim 1, wherein said interchangeable core member is connected to said base end of said pressure vessel by a twist-lock engagement.

18. A purification system as set forth in claim 1, further including a flow restrictor connected to the rejected water outlet means thereby restricting the discharging flow of rejected water to maintain water pressure within said pressure vessel.

19. A purification system as set forth in claim 1, wherein said interchangeable core member is connected to said base end of said pressure vessel by a twist lock engagement.

20. A multistage purification system adapted to be connected to inlet tubing from a water source, to reject water outlet tubing for discharging reject water and to pure water outlet tubing for discharging pure water comprising:
  a substantially cylindrical pressure vessel, said pressure vessel comprising:
    a base member and a top member connected together in sealed engagement such that the water pressure within the pressure vessel is maintained if influent water is supplied to said pressure vessel under pressure;
    a central core area within the pressure vessel and opening to outside the vessel through the base member;
    a circular support leg upon which said pressure vessel rests for stable disposition on a level surface;
    at least one inlet means extending through the base member for receiving water into said pressure vessel for purification; and,
    at least one reject water outlet means extending through the base member for discharging rejected water from said pressure vessel;
  a plurality of purification mediums disposed within said pressure vessel in concentric disposition; and,
  an interchangeable core member for disposition within the central core area within said pressure vessel, said interchangeable core member being removably connected to said pressure vessel and housing an additional means for purifying water, said interchangeable core member including a pure water outlet.

21. A purification system as set forth in claim 20, wherein said support leg and said pressure vessel define a compartment within which a connection of inlet tubing with said inlet means and a connection of reject water outlet tubing with said reject water outlet means are concealed from view if the pressure vessel is disposed on a level surface.

22. A purification system as set forth in claim 21, wherein said support leg further includes an opening through which the inlet tubing and the reject water outlet tubing pass from exterior to said system into said compartment.

23. A purification system as set forth in claim 20, wherein said base member is connected to said top member by threaded engagement.

24. A purification system as set forth in claim 20, wherein at least one of said purification mediums is a reverse osmosis module.

25. A multistage water purification system adapted to be connected to a source of water and having a reject water outlet and a pure water outlet, comprising:
  a substantially cylindrical pressure vessel having a base end and an opposite end, said pressure vessel including inlet means for receiving water into said pressure vessel for purification, at least one rejected water outlet means for discharging rejected water from said pressure vessel, and a central core area within the pressure vessel;
  a first tubular filter means sealingly disposed within the pressure vessel between the ends thereof and positioned with respect to the inlet means so that influent water flows radially inwardly through the filter means;
  a tubular reverse osmosis filter means made up of at least one spirally wound reverse osmosis membrane, said tubular osmosis filter means surrounded by the first tubular filter means spaced radially therefrom and adapted to have influent water flow longitudinally from one end thereof toward the other end thereof over said at least one membrane with purified water passing through said at least one membrane and being directed to the center of the tubular reverse osmosis filter means and to the central core area and water containing impurities not passing through the membrane flowing from the other end thereof, said other end thereof being positioned with respect to the rejected water outlet means so that water containing impurities flowing from the said other end flow through said rejected water outlet means;

sealing means cooperably positioned to direct flow of influent water passing through the first tubular filter means to the one end of the tubular reverse osmosis filter means; and an interchangeable core member for disposition within the central core area within said pressure vessel, said interchangeable core member being removably connected to said pressure vessel and housing an additional means for purifying water, said interchangeable core member including a pure water outlet means.

26. A purification system as set forth in claim 25, wherein the first tubular filter means has a first end toward the same end of the pressure vessel as the one end of the reverse osmosis filter means and a second end toward the same end of the pressure vessel as the other end of the reverse osmosis filter means, and wherein the sealing means cooperably positioned to direct flow of water passing through the first tubular filter means to the other end of the tubular reverse osmosis filter means is resilient sealing material positioned radially between the second end of the first tubular filter means and the reverse osmosis filter means, 27. A purification system as set forth in claim 25, wherein the resilient sealing material is integral with the second end of the first tubular filter means.

28. A purification system as set forth in claim 25, wherein the resilient sealing material also prevents flow of influent water passing through the first tubular filter means directly to the rejected water outlet.

29. A purification system as set forth in claim 25, wherein the inlet means, rejected water outlet means, and pure water outlet means are all positioned on the base end of the pressure vessel.

30. A purification system as set forth in claim 25, wherein the pressure vessel comprises a base member including the base end and a top member including the opposite end removably and sealingly secured together whereby the top member may be removed from the base member when it is desired to change the first tubular filter means or the reverse osmosis filter means.

31. A purification system as set forth in claim 30, wherein the inlet means and rejected water outlet means, are positioned on the base member of the pressure vessel, and the core member is connected to the base member so that the pure water outlet is also positioned on extends from the base member when the core member is connected thereto.

32. A purification system as set forth in claim 25, wherein the first tubular filter means is a sediment filter.

33. A purification system as set forth in claim 25, wherein the first tubular filter means is an assembly comprising a pre-filter and an activated carbon filter.

34. A purification system as set forth in claim 25, further including a perforated core cylinder encircling said central core area, and wherein said tubular reverse osmosis filter means encircles said perforated core cylinder.

35. A purification system as set forth in claim 25, wherein said interchangeable core member includes an activated carbon filter.

36. A purification system as set forth in claim 25, wherein said interchangeable core member houses an ultraviolet tube.

37. A purification system as set forth in claim 25, wherein said interchangeable core member is connected to said pressure vessel by a snap in engagement.

38. A purification system as set forth in claim 25, wherein said interchangeable core member is connected to said pressure vessel by a twist lock engagement.

39. A purification system as set forth in claim 25, further including a flow restrictor connected to the rejected water outlet means thereby restricting the discharging flow of rejected water to maintain water pressure within said pressure vessel.

* * * * *